US007374488B2

(12) United States Patent
Schober et al.

(10) Patent No.: US 7,374,488 B2
(45) Date of Patent: May 20, 2008

(54) PLAYER INSERT FOR A GAMING MACHINE, A GAMING SYSTEM AND A METHOD OF OPERATING A GAMING SYSTEM

(75) Inventors: Helmut Schober, Heiligenkreuz am Waasen (AT); Peter Hoedl, Graz (AT); Robert Zechner, Knittelfeld (AT)

(73) Assignee: Atronic Systems G.m.b.H., Unterpremstätten (AT)

(*) Notice: Subject to any disclaimer, the term of this patent is extended or adjusted under 35 U.S.C. 154(b) by 666 days.

(21) Appl. No.: 10/419,057

(22) Filed: Apr. 17, 2003

(65) Prior Publication Data

US 2004/0209692 A1 Oct. 21, 2004

(51) Int. Cl.
*A63F 13/00* (2006.01)

(52) U.S. Cl. ............................ 463/29; 463/20; 463/42

(58) Field of Classification Search .................. 463/42, 463/29

See application file for complete search history.

(56) References Cited

U.S. PATENT DOCUMENTS

| | | | | |
|---|---|---|---|---|
| 4,521,775 | A | 6/1985 | Noble | |
| 6,217,448 | B1 | 4/2001 | Olsen | |
| 6,368,216 | B1 * | 4/2002 | Hedrick et al. | 463/20 |
| 6,600,527 | B1 * | 7/2003 | Basturk et al. | 349/74 |
| 6,800,029 | B2 * | 10/2004 | Rowe et al. | 463/25 |
| 6,896,618 | B2 * | 5/2005 | Benoy et al. | 463/25 |
| 6,923,720 | B2 * | 8/2005 | Loose | 463/16 |
| 6,997,803 | B2 * | 2/2006 | LeMay et al. | 463/20 |
| 2001/0031658 | A1 | 10/2001 | Ozaki et al. | |
| 2001/0036857 | A1 | 11/2001 | Mothwurf et al. | |
| 2002/0132663 | A1 | 9/2002 | Cumbers | |
| 2002/0173354 | A1 * | 11/2002 | Winans et al. | 463/20 |
| 2003/0050117 | A1 * | 3/2003 | Silva et al. | 463/36 |
| 2003/0054881 | A1 | 3/2003 | Hedrick et al. | |
| 2003/0064771 | A1 * | 4/2003 | Morrow et al. | 463/16 |
| 2004/0029636 | A1 * | 2/2004 | Wells | 463/32 |
| 2004/0184027 | A1 * | 9/2004 | Mizutani et al. | 356/71 |

FOREIGN PATENT DOCUMENTS

| | | |
|---|---|---|
| JP | 08080364 | 3/1996 |
| WO | WO 99/32945 A1 | 7/1999 |
| WO | WO 99/53454 A1 | 10/1999 |

* cited by examiner

*Primary Examiner*—Robert E. Pezzuto
*Assistant Examiner*—Frank M Leiva
(74) *Attorney, Agent, or Firm*—Patent Law Group LLP; Brian D. Ogonowsky

(57) ABSTRACT

A player insert for a gaming machine, the player insert comprising: an electronically controllable screen, a controller for said electronically controllable screen, an interface adapted to communicate between said controller and a host system associated with said player insert and with further player inserts, said controller being adapted to receive signals from a said host system via said interface and to thereby effect a display on said electronically controllable screen synchronized with at least one further display on at least one further player insert. The electronically controllable screen can be controlled to operate in a first state in which it is transparent and permits a separate display provided behind the screen to be viewed by the player and in a second state in which it is adapted to effect the display as stated above. The description and claims also relate to a gaming system including a plurality of gaming machines each having a respective player insert and to a method of operating such a gaming system.

31 Claims, 3 Drawing Sheets

Figures 1A, 2:
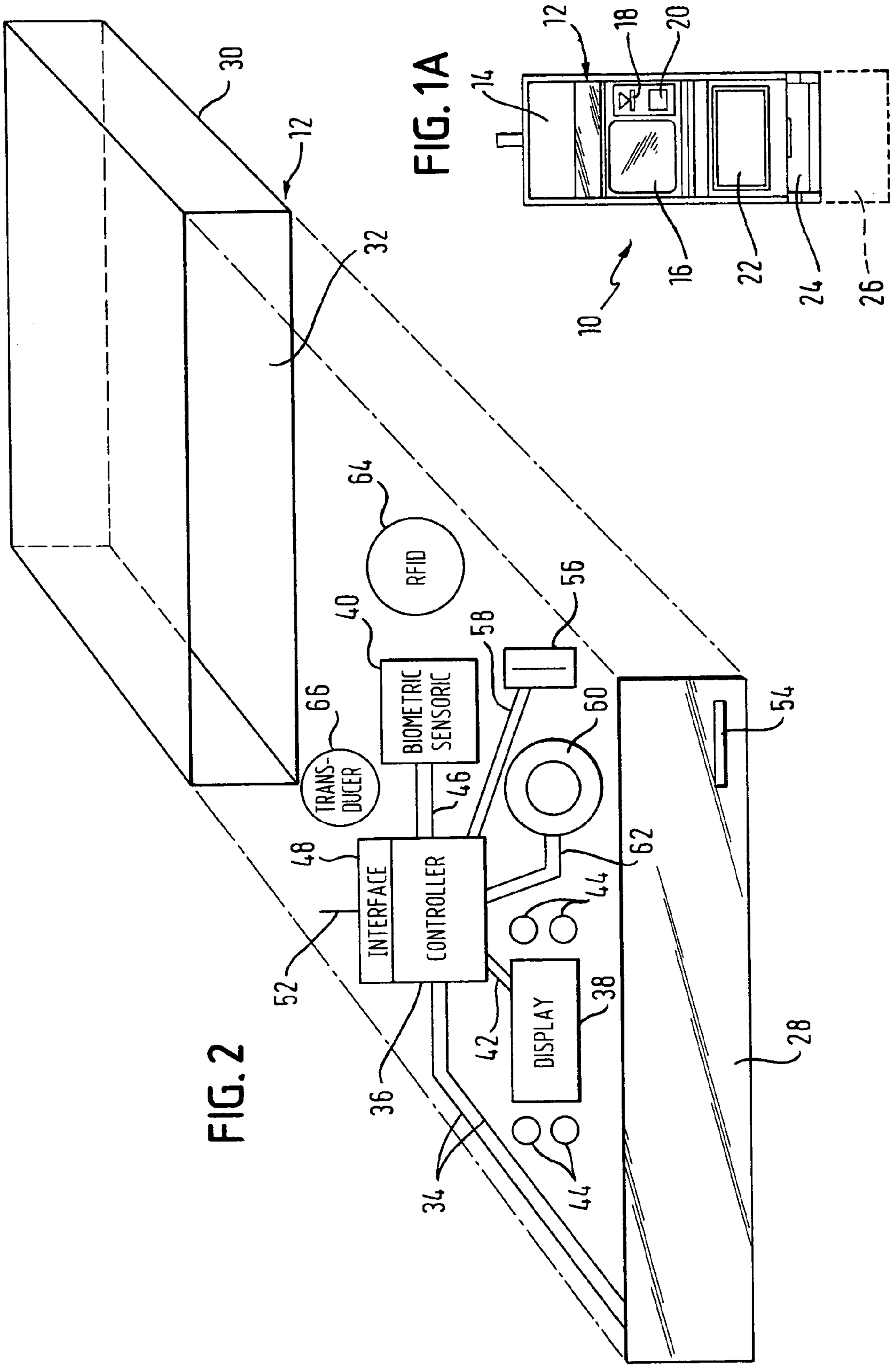

PLAYER INSERT FOR A GAMING MACHINE, A GAMING SYSTEM AND A METHOD OF OPERATING A GAMING SYSTEM

FIELD OF THE INVENTION

The present invention relates to a player insert for a gaming machine, to a gaming system including a plurality of gaming machines and to a method of operating a gaming system including a plurality of gaming machines.

Player inserts for gaming machines, a gaming system including a plurality of gaming machines each having a player insert and methods of operating gaming systems involving gaming machines using the player inserts are well known in the art. The player insert is basically a module which is inserted into a gaming machine, typically into a generally box-shaped space located above the monitor of the gaming machine on which the game is played and beneath the so-called top box, which generally includes a pane of glass showing the pay-out table of the gaming machine.

The underlying idea of a player insert is to assist the casino in tracking individual players activities within the casino. Such information can be exploited by the casino to increase the casino's membership and increase the total turnover by the casino. By tracking the individual players a casino can react faster to the players' needs.

A typical player insert or player tracking module as currently in use has a front panel extending generally across the width of the gaming machine and including an illuminated display taking up a part of the front panel which is used to inform the player about different activities taking place within the casino or providing information about the possibilities offered by the gaming machine on which he is playing, including information about the jackpots in which the player can participate.

Furthermore, the front panel typically includes a keypad to give the player the possibility to interact with the player tracking module and the display and to enter data for the illuminated display. It will generally also include a card reader to identify the player because the unambiguous identification of the player, if not by name, by virtue of a player card, is an essential integer of a player tracking system to enable a casino to reliably associate activities undertaken by a player in the casino with a specific player even if his true name is not known to the casino.

The problem with existing player inserts or player tracking modules is that they are not sufficiently flexible to enable a casino to identify players reliably and that it is also difficult if not impossible to integrate existing player inserts into some sophisticated casino systems such as jackpot systems, bonus systems and others, for example into a jackpot system as described in U.S. patent application Ser. No. 09/761,439, and the corresponding South African patent number 2001/0670.

PRINCIPLE OBJECT OF THE INVENTION

It is the principle object of the present invention to provide a player insert for a gaming machine, a gaming system including a plurality of gaming machines each having a respective player insert and a method of operating a gaming system including a plurality of such gaming machines which provides substantially enhanced flexibility in the identification of players and/or which makes it easier to integrate a gaming machine having such a player insert into bonus and jackpot systems and player tracking systems.

Moreover, it is a further object of the present invention to provide a new way of promoting interest and an air of excitement in a casino by the staging of special effects all over the casino floor in combination with a jackpot system and by simultaneously utilizing the player insert of the invention.

BRIEF SUMMARY OF THE PRESENT INVENTION

In order to satisfy the above object there is provided, in accordance with a first aspect of the present invention, a player insert for a gaming machine, said player insert comprising:

an electronically controllable screen operable in a first state in which it is transparent and in a second state in which it is adapted to function as a display and a separate display provided behind said electronically controllable screen and visible to a player essentially only when said electronically controllable screen is in said first state.

A player insert of this kind has the advantage that the electronically controllable screen can be operated in the second state to provide information drawing the attention of a player at the gaming machine, or people in the vicinity of the gaming machine, to events or spectacular wins on a gaming machine or at a gaming table elsewhere in the casino, or to jackpot wins, thus generally elevating the level of excitement and interest in gaming at the casino. Because gaming machines are usually installed in rows along side one another the electronically controlled screens, which preferably take up the full width of the gaming machine, can be used as a running display for example with arrows or chevrons, moving progressively across the screen of one gaming machine on to the screen of the next gaming machine and so on to direct particular attention to a gaming machine where a major win has occurred, or to strategically positioned monitors, so that all visitors of the casino are able to participate in the excitement associated with the wins achieved by players. Moreover, although the player inserts are used only at gaming machines, they can also be integrated into the general casino system so that wins at gaming tables are also indicated to the players at gaming machines, thus raising the level of interest of gaming machine players in table games.

The display previously associated with a player insert, which took up only a small portion of the front panel of the player insert and which was only able to display restricted information is still present but is now provided behind the electronically controlled screen and is visible to a player essentially only when the electronically controlled screen is in the first state.

This arrangement also provides the opportunity to place a biometric sensor behind the screen, with the biometric sensor being adapted to read biometric data of the player through the screen. The biometric sensor can for example comprise a camera adapted to record the physical features of the player, for example physical features of his face, of his eyes, of his eyes and nose, of at least one of his hands or of at least one of his fingers or for example in the form of a four finger print.

Thus such biometric sensor can be used to uniquely identify a player—without having to know his true identity—in a manner which enables the casino to track his gaming activities in the casino and to provide him with gratuities or entitlement to participate in special bonus games or jackpots.

Various other items can also be "hidden" behind the screen such as a loudspeaker enabling audio interaction with the player or other items associated with player tracking. It is also possible to incorporate a card slot into the front panel, i.e. into the electronically controlled screen so that a player possessing a player card can play at the gaming machine and his identity can be thus attained from the player card. Such player cards can also store information relating to past use of the card, financial information about activities undertaken by the player and also prepaid credit information if the card is configured as a credit card, either loadable by prepayment at a cash desk of the casino or in the form of a standard credit card.

To allow the player to interact with the separate display the electronically controllable screen can include a touch screen area integrated into it or can include a keypad or menu bottom, strategically placed for use without significantly disturbing the possibilities of the screen function as a display displaying information when the electronically controllable screen is in the second state.

Various types of electronically controllable screens can be considered, such as for example an OLED foil screen or a liquid crystal screen.

According to another aspect of the present invention there is provided a player insert for a gaming machine, and the player insert comprising:

- an electronically controllable screen,
- a controller for said electronically controllable screen,
- an interface adapted to communicate between said controller and a host system associated with said player insert and with further player inserts, said controller being adapted to receive signals from a said host system via said interface and to thereby effect a display on said electronically controllable screen synchronized with at least one further display on at least one further player insert.

Because the controllers of the electronically controllable screens are interfaced to host system, the host system can instruct the controllers present to select one of a range of possible displays on the electronically controllable screen and can ensure that a display on one electronically controllable screen is synchronized with at least one further display on at least one further player insert. In this way it is possible, for example, to ensure that the player inserts of all gaming machines are synchronized so that attention gaining displays, such as running arrows or chevrons, direct the players attention to a central point of interest, such as a further gaming machine or a display giving particulars of a win which has just been realized.

The system can be flexibly designed so that the host system can also send information to the controller about new displays which are to be realized on the electronically controllable screen and to matters such as changing colors etc. Moreover, the interface between the host system and the controller makes it easy to transfer biometric data from the biometric sensor or identity information from a card reader or any other identification device from the individual gaming machine to the host system where it can be related to a player's activities on other gaming machines or at gaming tables etc.

The present invention also relates to a gaming system including a plurality of gaming machines and a host system associated with said gaming machines, there being a respective player insert associated with each gaming machine and each said player insert comprising:

- an electronically controllable screen,
- a controller for said electronically controllable screen, said controller having an interface adapted to communicate between said controller and said host system, said host system being adapted to transmit signals to said controller via said interface and said controller being adapted to thereby effect a display on said electronically controllable screen, said display being synchronized with at least one further display on at least one further player insert.

Moreover the present invention also relates to a method of operating gaming systems including a plurality of gaming machines and a host system associated with said gaming machines, there being a respective player insert associated with each gaming machine and each said player insert comprising:

- an electronically controllable screen,
- a controller for said electronically controllable screen, said controller having an interface adapted to communicate between it and said host system, said host system being adapted to transmit signals to said controller via said interface and said controller being adapted to thereby effect a display on said electronically controllable screen, said display being synchronized with at least one further display on at least one further player insert, the method comprising the steps of:

- a) making a determination via the host system of when a jackpot associated with a gaming machine has been won and
- b) operating said host system to instruct said controllers of said electronically controllable screens of said player inserts of said gaming machines to display synchronized signals drawing attention of players at said gaming machines and others patrons of a casino to a gaming machine where said jackpot has been won.

In all aspects of the invention the possibility exists of extending the electronically controllable screen to include a region adapted in use to be positioned at a front of the top box of the gaming machine. In this way the region can be utilized during normal playing to display a payout table associated with the associated gaming machine but can be incorporated into a large area display for the provision of information, running arrows, chevrons and the like in the event of a win to which the casino wishes to draw attention or to provide further information to players, for example of a special floorshow or of other events which may be about to start or may take place at a certain time.

Other aspects of the invention will be described in more detail in the following by way of example only with reference to the accompanying drawings and are also set forth in the accompanying claims.

BRIEF LISTING OF THE DRAWINGS

Figure 5:
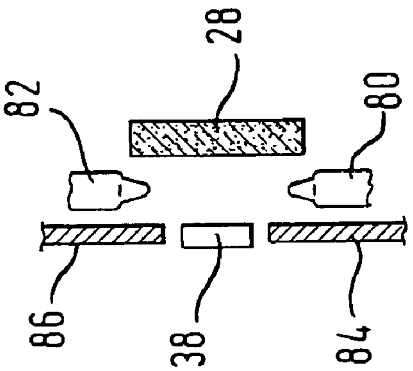
Figure 4:
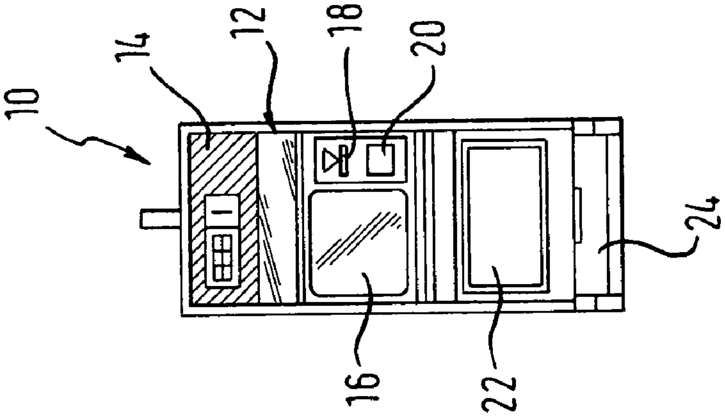
Figure 1B:
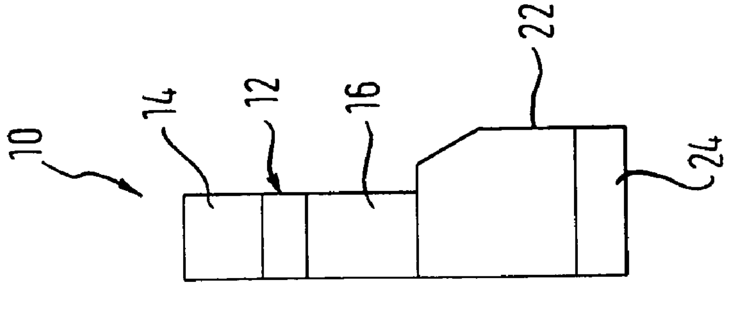
Figure 3:
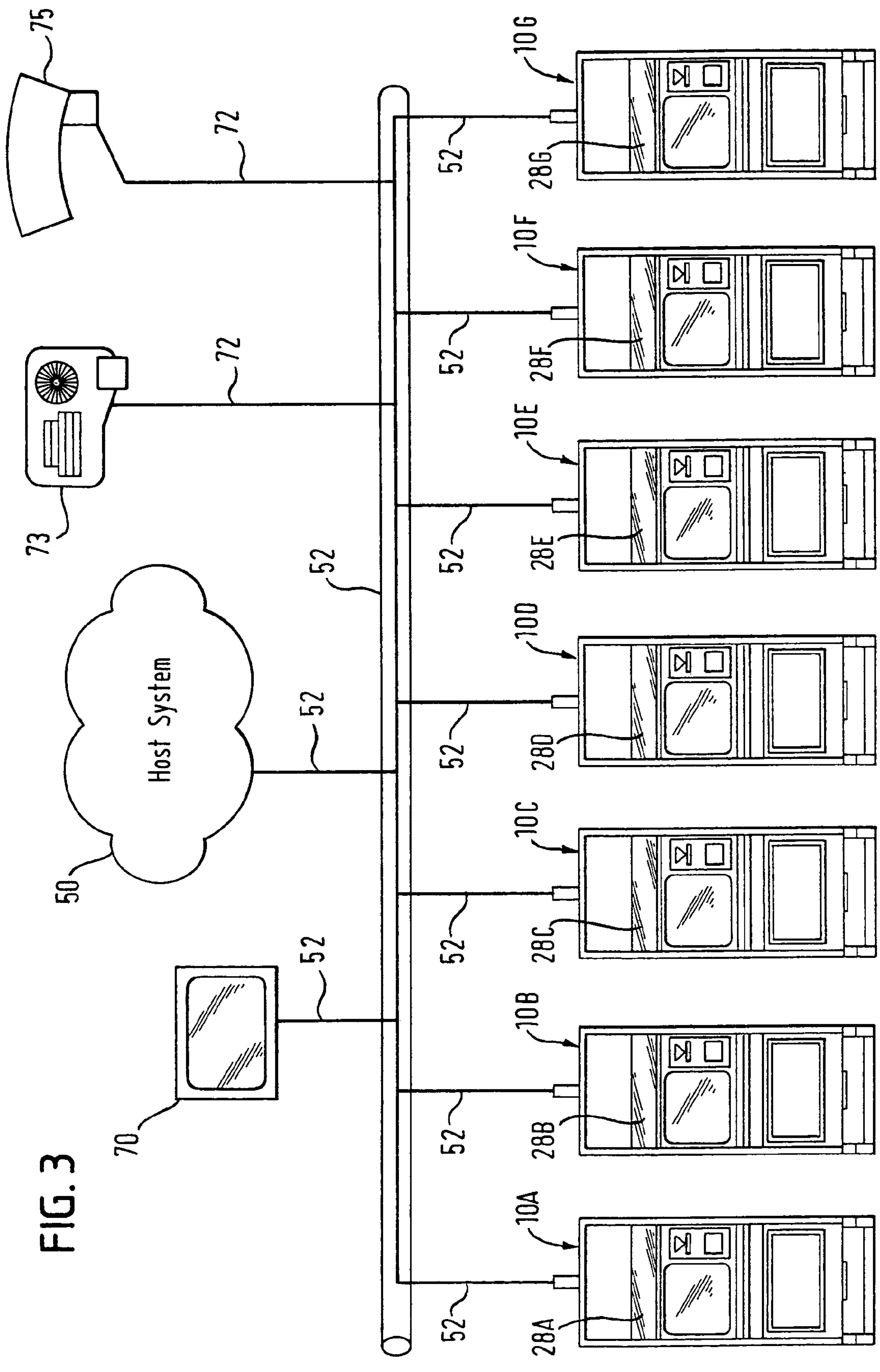

FIGS. 1A, 1B show schematic representations of the front side and side view of a modular gaming machine, FIG. 2 shows a schematic exploded view of a player insert for use in the gaming machine of FIG. 1, FIG. 3 shows a schematic view of a plurality of gaming machines connected via a local area network to a host system, FIG. 4 shows a view of a gaming machine similar to FIG. 1, but in which the electronically controllable screen of the player insert is extended upwardly to cover the top box of the gaming machine, FIG. 5 shows a section through an alternative front panel of a player insert realized using a dark glass plate.

Turning now to FIG. 1 there can be seen a front view of a gaming machine 10 having a conventional layout of a gaming machine except for the player insert 12 which is contrived in accordance with the present invention. FIG. 1A shows a side view of the gaming machine.

As shown, the gaming machine comprises a customary top box 14 which is used to display a payout table related to the game. The progress of the game itself can be followed by the player at the monitor 16. For example, if the gaming machine is configured as a fruit machine, then the payout table can for example show that a row of three lemons correlates to a win of 1 $, whereas a row of three hearts correlates to the top win of 10 $. To the right of the monitor 16 there is a slot 18 which is a bill acceptor into which a player can insert one or more bank notes when playing at the machine. Beneath the bill acceptor 18 there is a coin acceptor into which the player can insert coins when playing at the machine or tokens if the casino operates a token system rather than permitting gaming with normal currency. The reference numeral 22 points to a front door of a coin or token collector for the machine which collects coins or tokens inserted by the player into the coin slot 20. If the player achieves a win at the machine then his winnings are paid out into the tray 24 located beneath the coin or token collector 22.

Frequently a gaming machine of the above described kind is supplemented by a so-called drop box 26 located beneath the payout tray 24. The purpose of the drop box is to accept coins or tokens from the coin or token collector behind the door 22 when the latter is full.

As is apparent from FIG. 1, the player insert 12 has a screen 28 which extends substantially over the full width of the gaming machine. In fact the player insert 12 actually has a box-like or open box-like structure 30 shown in an exploded perspective view in FIG. 2. The front screen 28 of the player insert 12 is shown in FIG. 2 spaced from the front opening 32 of the player insert and the items located behind the screen are also shown spaced in front of the box-like structure 30. When the unit is assembled, the items shown behind the screen 28 (i.e. above the screen in FIG. 2) are all located in the box-like structure 30 and the front screen 28 covers over the front opening of the box-like structure 30. The unit so formed is an insert which can be inserted into the gaming machine beneath the top box 14 in the manner evident from FIG. 1A and FIG. 1B.

The front screen 28 is an electronically controllable screen, preferably in the form of an OLED foil screen and is connected via schematically illustrated leads 34 to a controller 36 which is configured to control the screen 28 to adopt one of two states. In the first state the screen is transparent so that the player is able to see the items located behind the screen, in particular the separate display 38 and the biometric sensor 40. The separate display 38 is connected to the controller 36 via control lines 42 so that the controller is able to display desired information on the display 38. Associated with the display 38 are four control buttons 44 which are connected via respective signal lines (not shown) to the display 38 and/or to the controller 36 and which enable a player to access various items of information on the display. For example, the player could access the amount of credit he still has available on the machine or a list of his wins on the machine to date. In addition the player can use the buttons 44 to call up or access services of interest to him. For example, this system offers the player the possibility of conducting e-commerce at the slot machine, as well as the possibility of ordering drinks, snacks or smoking requisites or other items and of making hotel reservations or ordering a taxi etc.

Moreover, the display 38 can be configured to enable the player to input information via the buttons 44 relating to his identity. Should it not be possible to identify the player in any other way, the controller could demand of the player that he inputs his identity via the buttons 44 and the display. The buttons are either physical buttons accessible from the front side of the front screen 28, e.g. buttons mounted in a discrete manner on the front screen, or are formed by areas of the front screen configured as a touch screen or buttons operable by, e.g., capacitive proximity sensors through the screen in response to the players' fingertips.

The biometric sensor 40 provides one way of determining the identity of the player and it is connected for this purpose to the controller 36 via leads 46. If provided, the biometric sensor 40 is able to view the player through the front screen 28 when this is controlled by the controller 36 to adopt the first transparent state. The biometric sensor can, for example, comprise a camera adapted to record physical features of a player comprising at least one of physical features of his face, of his eyes, of his eyes and nose, of at least one of his hands, of at least one of his fingers and of four of his finger tips. This information is transmitted to a controller 36 and can be passed via an interface 48 to a host system 50 which is shown schematically in FIG. 3. The host system, typically a computer with significant computing abilities, is connected to the gaming machine and indeed to each of the player inserts via a network, such as a local area network indicated by the reference numeral 52 in FIG. 3.

Furthermore, an inconspicuous card slot 54 is provided in the front screen or panel, as can be seen at the right hand side of the representation of the screen 28 in FIG. 2. The card slot could be differently arranged on the front panel and it could also adopt a horizontal or inclined position if desired. Behind the card slot there is located a card reader 56 connected via leads 58 to the controller 36. Thus, if a player of the gaming machine has a player card, he can insert the player card through the card slot 54 into the card reader 56 and the card reader can transfer information it reads from the card to the controller and thus from the controller via the interface 48 and the local area network 52 into the host system 50. Also provided behind the front screen 28 are one or more loudspeakers 60 which are connected to the controller 36 via leads 62. This makes it possible for the controller to play music to the player via the loudspeaker, or to pass messages to him, for example messages relating to a win or to other gaming possibilities within the casino.

In addition an RFID unit 64 and a transducer 66 are provided in the player insert and are each connected to the controller 36. The RFID unit 64 is a wireless identification system, e.g. RF (radio frequency) or infrared based designed to identify players and may also allow casino staff to authenticate themselves to the gaming system in order to perform maintenance tasks or access other protected system features. This wireless identification system consists of an the ID reader unit 64 within the player insert 12 and of ID-tags, ID-cards or ID-transmitters carried by the players and the casino staff. Thus an identity chip (a so called ID-chip), incorporated in the tag, card or transmitter and carried by the players and the casino staff, can be brought into the vicinity of the unit 64 and can transmit identity information relating to the respective person to the controller 36. The transducer 66 picks up external signals and also communicates with the controller 36.

The controller is also able to control the front screen 28 in such a way that it can display information or can take on special coloring (multi-coloring or single coloring as desired). In the second state the screen 28 hides the items located behind it so that these are not visible to the player.

Some of the displays for the front screen 28, when in the second state, can be stored in memory areas associated with the controller and other displays can be imposed on the front screen by the host system 50 communicating with the controller 36 via the local area network 55 and the interface 48. This makes it possible for the casino to actuate all controllers simultaneously or in a desired sequence so that all gaming machines can be operated in a synchronized manner or supplied with a new suit of programs for the display on the front screen.

In the example of FIG. 3 seven identical gaming machines 10A to 10G are placed alongside one another in a row. If, for example, the player playing at the gaming machine 10D secures a win, then the electronically controllable screens 28A to 28C can be energized via the host system, the local area network 52, the interface 48 and the respective controllers 36 to show running arrows or chevrons which point to the right towards the gaming machine 10D. That is to say a particular arrow may start at the left of the gaming machine 10A, move progressively to the right of the gaming machine 10A, then appear to move progressively to the left of the gaming machine 10B and from there to the right of the gaming machine 10B and subsequently from the left of the gaming machine 10C before leaving it at the right-hand side. This first arrow can be followed by a succession of further arrows. In similar way a succession of arrows moving to the left can be displayed on the front screens 28E, 28F and 28G of the gaming machines 10E, 10F and 10G, with the arrow in this case starting at the right-hand side of the gaming machine 10G, moving to the left-hand side of the gaming machine 10G and then appearing to continue at the right-hand side of the gaming machine 10F and continuing its movement to the left-hand side of the gaming machine 10F and subsequently continuing its movement from the right of the gaming machine 10E to the left of the gaming machine 10E. The front screen 28D of the gaming machine 10D can be energized to display the win itself. Alternatively, the win can be displayed on a monitor 70 disposed strategically in the vicinity of the gaming machines 10A to 10G so that it is visible to all players. The monitor 70 can, for example, be a TFT display or a plasma screen. The monitor 70 is again connected to the host system 50 via the local area network 52. At times when no win has occurred at the gaming machines 10A to 10G, the front screens 28A to 28G can simply be provided with a color display showing one or more different colors and indeed the color display can change in time, for example to give a psychedelic appearance or to generate a harmonious atmosphere in the casino.

The lines 72, which can be physically identical to the lines 52 or different from them, indicate an extension of the local area network to gaming tables, such as roulette table 73 and black jack table 75, located at other positions in the casino. The wins at the gaming tables can also be displayed, if desired, on the front screens 28A to 28G of one or more of the gaming machines 10A to 10G or on the monitor 70.

If the gaming tables include side games or participate in jackpot systems, in which the gaming machines 10A to 10G can also participate, then jackpot wins can also be highlighted on one or more of the front screens 28A to 28G and/or on the monitor 70.

Should a particular player not just win a game at a gaming machine but win a jackpot, or be allotted some other bonus, then this can also be displayed on the respective screen 28A to 28G associated with the player and/or on the monitor 70, in a manner highlighting the players benefit and thus providing added excitement in the casino and encouraging others to participate at gaming machines or gaming tables.

The host system 50 can be configured to operate a so-called "tornado system" in accordance with the aforementioned US patent application U.S. Ser. No. 09/761,439 and the displays associated with the tornado system can be realized, amongst other things, on the front screens 28A to 28G. They can be integrated into a system showing for example an event progressing through the casino, such as a "tornado" as described in the aforementioned U.S. patent application Ser. No. 09/761,439. That application also describes how configurable jackpots can be created or managed and the system described here is also fully compatible with and can be integrated into such jackpot systems. The disclosure of the above referenced U.S. Ser. No. 09/761,439 is incorporated herein by reference.

As shown in FIG. 4, the front screen 28 of each player insert can also be extended upwardly so that it covers the whole (or part) of the top box of the gaming machine. The screen 28 can then be controlled by the controller so that the region located in the front of the top box is used to display the payout table for the gaming machine. It is only the region covering the player insert itself which need be made transparent when it is desired to use the separate display or one or other of the items located behind the front screen. Because the payout table is displayed in the region of the screen in front of the top box 14, it is possible to blend out, make transparent or hide this display when it is desired to show special displays or special information relating to games or jackpots on the gaming machine. Thus, the area of the top box can also be incorporated into the display so that a larger area display results and thus makes the display more effective.

Although the screens disclosed to date are realized, in the preferred form as an OLED foil screen, they can also be realized as a liquid crystal screen, again under control of a controller 36. Such liquid crystal screens which can be operated in a first state in which they are transparent and in a second state in which they are adapted to display information are, for example, described in European patent application, publication no. 88126.

Another way of realizing a screen, which can be operated in a first state in which it is transparent and in a second state in which it is adapted to display information, is shown in FIG. 5. Here, the screen 28 takes the form of a dark glass plate and light emitting diodes 80 and 82 are provided in rows at the top and at the bottom of the dark glass plate. Behind each row of light emitting diodes 80, 82 there are respective mirrors 84, 86 which serve to reflect light from the LEDs onto the dark glass plate. This form of illumination provides the opportunity to arrange for color displays on the dark glass plate, or to display different colors or to provide displays which seem to move from the left right or from the right left by a sequential energization of the LEDs of the individual rows. Behind the dark glass plate there is also a display 38 similar to the display previously described, with the display only being visible when the LEDs in this vicinity are not illuminated and when the display itself provides a luminous intensity, which can be viewed through the dark glass plate, so that the information on the display 38 is visible to a viewer on the other side of the dark glass plate. For the purpose of interaction with the separate display 38 there can also be a keypad or menu buttons such as 44 in FIG. 2.

In addition to providing menu buttons 44 or a keypad it is also possible to realize an area of the electronically controllable screen 28 as a touch screen for the control of the display. If the dark glass screen 28 of FIG. 5 is adopted, then the items shown in FIG. 2 behind the front screen 38 can also be provided behind such a dark glass screen.

In general, it is preferred for the screen 28 to extend over the full width of the gaming machine and over the full height of the player insert. Indeed it is most preferable for the screen to be extended upwardly so that it also has a region located in front of the full area of the top box 14. Such an arrangement maximizes the display area and thus the effective size of the display. It is, however, also conceivable to operate with a display which is slightly smaller than the full area of the front panel of the player insert. For example, the controllable screen may be smaller in width than of the full width of the player insert and may be smaller in height than the full height of the player insert.

As a result of the use of a local area network 52 linking the slot machines 10A to 10G and the gaming tables 73 and 75 to the host system, the above described system can be used by the casino management to present information to the players about any and all other activities in the casino and elsewhere and can also be used by the players to interact with each other and the casino management.

For example, it is known to arrange so called tournaments at the slot machines. For this it is necessary for the casino to announce to the players that a tournament can be held at a specific time or within a specific time slot and the players who wish to compete must indicate this to the casino management. The casino can thus use the front screens 28A to 28G and/or monitors such as 70 and/or the displays such as 38 to indicate to the players that a tournament is planned. The players who are interested can apply to join the tournament using the buttons 44 to communicate this to the casino management, with the displays 38 and/or the front screens 28A to 28G providing a suitable mask and/or interactive displays to support this application and the tournament. A tournament is understood to be a competition played amongst a group of players at the slot machines in which for the purpose of the tournament the odds at the slot machines are raised considerably in favor of the players and the player with the highest winnings at the end of the tournament receives a prize, which may or may not be related to the "winnings" he has achieved. The lower "winnings" achieved by the other players do not generally lead to prizes or real winnings for the other players, they merely serve to decide who has won the tournament. Of course they can also be used to allot consolation prizes or booby prizes if desired.

Other possibilities which can be realized using the buttons 44 and the screens 28A to 28G and/or the displays 38 include the possibility for the player to request a video be made available to him "video on demand", for example a film or a music video. Also the system can enable the player to call up current news programs or sporting events. Bonus points collected by a player during one or more visits to the casino can also be used as payment for pay by view videos or programs. Such videos or television broadcasts or pay by view systems or advertising by the casino can all be displayed on either the front screens 28A to 28G of FIG. 3 and or on the displays 38. Alternatively the casino could provide a dedicated viewing area for the player to view whatever he has selected while freeing the gaming machine for another player. The system can also enable the player to participate in network games and as a message system.

What we claim is:

1. A player insert for a gaming machine, said player insert composing:

an electronically controllable screen operable in a first state in which it is transparent and in a second state in which it is adapted to function as a display, the player insert having a face, the electronically controllable screen substantially covering the entire face of the player insert;

a controller coupled to the electronically controllable screen and configured to control the electronically controllable screen to display images for public viewing unrelated to personal information concerning a player of the gaming machine, when the electronically controllable screen is in the second state a separate display provided behind said electronically controllable screen and visible to a player essentially only when said electronically controllable screen is in said first state, the separate display being smaller than the electronically controllable screen, the controller being coupled to the separate display and configured to display personal information concerning the player when the electronically controllable screen is in the first state; and at least one input sensor accessible to a player through the electronically controllable screen to convey information from the player.

2. A player insert in accordance with claim 1, said electronically controllable screen being an OLED foil screen.

3. A player insert in accordance with claim 1, said electronically controllable screen being a liquid crystal screen.

4. A player insert in accordance with claim 3, said electronically controllable screen comprising at least one row of electronically controllable LEDs and a translucent plate member adapted to appear opaque when said LEDs are energized and transparent when said LEDs are not energized.

5. A player insert in accordance with claim 4, said translucent plate member comprising a darkened glass plate.

6. A player insert in accordance with claim 1 and further comprising a biometric sensor disposed behind said screen and adapted to read biometric data of a player through said screen.

7. A player insert in accordance with claim 6, said biometric sensor comprising a camera adapted to record physical features of a player comprising at least one of physical features of his face, of his eyes, of his eyes and nose, of at least one of his hands, of at least one of his fingers and of four of his finger tips.

8. A player insert in accordance with claim 1 and further comprising a loudspeaker positioned behind said screen.

9. A player insert in accordance with claim 1 and further comprising a card slot provided in said screen and associated with a card reader disposed behind said screen.

10. A player insert in accordance with claim 9, said card reader being adapted to read a card adapted to store at least one of identification information relating to said player, information relating to past use of said card, financial information and prepaid credit information.

11. A player insert in accordance with claim 9, said card being at least one of a card having a magnetic stripe, a smart card, and a card adapted for use in a cashless gaming system.

12. A player insert in accordance with claim 1, wherein touching a touch screen integrated into the electronically controllable screen controls the separate display.

13. A player insert in accordance with claim 1 and further comprising a keypad integrated into said electronically controllable screen, said keypad being adapted to permit communication between a player and said separate display.

14. A player insert in accordance with claim 1 and further comprising at least one menu button provided at said electronically controllable screen and adapted to permit communication between a player and said separate display.

15. A player insert in accordance with claim 1 and further comprising a RFID receiver.

16. A player insert in accordance with claim 1 and further comprising a transducer.

17. A player insert in accordance with claim 1, said player insert having a width at a side facing a player and said electronically controllable screen extending over at least a major portion of said width.

18. A player insert in accordance with claim 17, said electronically controllable screen extending over substantially the whole of said width.

19. A player insert in accordance with claim 17, said player insert having a height at said side facing a player and said electronically controllable screen extending over at least a major portion of said height.

20. A player insert in accordance with claim 19, said electronically controllable screen extending over substantially the whole of said height.

21. A player insert in accordance with claim 1, said electronically controllable screen being adapted to display at least one of casino information, decorative images, payout information, information concerning other gaming possibilities, limits for jackpots, videos, music videos, sporting programs, news programs, news items, messages and any other information of interest to players.

22. A player insert in accordance with claim 1, said electronically controllable screen being adapted to present directional information in the form of at least one of a running light, one or more moving arrows, one or more moving chevrons and a variable illumination drawing attention to at least one of the said player insert, a player insert associated with another gaming machine and a display associated with one or more gaming machines.

23. A player insert in accordance with claim 1, one of said display and said electronically controllable screen being adapted to fulfill at least one of the following functions: inform a player about different events in an associated casino, inform a player about jackpot values, inform a player that he has won a jackpot award, inform a player of the size of a jackpot award he has won, inform a player of a win other than a jackpot award, inform a player of a state of an account (credit) held by a casino on his behalf, inform a player of bonus points allotted to him, inform a player of any gratuity allotted to him., and inform a player about activities elsewhere in a casino.

24. A player insert in accordance with claim 1, said electronically controllable screen being adapted to display special effects.

25. A player insert in accordance with claim 1, and further comprising a mechanism for releasably securing said player insert in an associated gaming machine.

26. A player insert in accordance with claim 1, said electronically controllable screen including a region adapted in use to be positioned at a front of a top box of a gaming machine.

27. A player insert in accordance with claim 26, said region being adapted to display a pay-out table.

28. A player insert in accordance with claim 26, said region of said electronically controllable screen being adapted to display at least one of casino information, decorative images, payout information, information concerning other gaming possibilities, limits for jackpots, videos, music videos, sporting programs, news programs, news items, messages and any other information of interest to players.

29. A player insert in accordance with claim 26, said region of said electronically controllable screen being adapted to present directional information in the form of at least one of a running light, one or more moving arrows, one or more moving chevrons and a variable illumination drawing attention to at least one of the said player insert, a player insert associated with another gaming machine and a display associated with one or more gaming machines.

30. A player insert in accordance with claim 26, one of said display and said region of said electronically controllable screen being adapted to fulfill at least one of the following functions: inform a player about different events in an associated casino, inform a player about jackpot values, inform a player that he has won a jackpot award, inform a player of the size of a jackpot award he has won, inform a player of a win other than a jackpot award, inform a player of a state of an account (credit) held by a casino on his behalf, inform a player of bonus points allotted to him, inform a player of any gratuity allotted to him, and inform a player about activities elsewhere in a casino.

31. A player insert in accordance with claim 26, said region of said electronically controllable screen being adapted to display special effects.

* * * * *